United States Patent
Pe'er et al.

(10) Patent No.: US 12,066,902 B2
(45) Date of Patent: Aug. 20, 2024

(54) SYSTEM AND METHOD FOR DATABASE RECOVERY

(71) Applicant: Coinbase IL RD Ltd., Oakland, CA (US)

(72) Inventors: Guy Pe'er, Talmey Yechiel (IL); Nir Steinherz, Modiin-Maccabim-Reut (IL); Elena Gorelikov, Yoqneam Illit (IL); Valery Osheter, Ashdod (IL); Danny Tabak, Tel Aviv (IL)

(73) Assignee: Coinbase IL RD Ltd., Oakland, CA (US)

( * ) Notice: Subject to any disclaimer, the term of this patent is extended or adjusted under 35 U.S.C. 154(b) by 262 days.

(21) Appl. No.: 17/528,226

(22) Filed: Nov. 17, 2021

(65) Prior Publication Data
US 2023/0153209 A1      May 18, 2023

(51) Int. Cl.
*G06F 11/14*      (2006.01)
*G06F 21/60*      (2013.01)

(52) U.S. Cl.
CPC ...... *G06F 11/1469* (2013.01); *G06F 11/1464* (2013.01); *G06F 21/602* (2013.01); *G06F 2201/84* (2013.01)

(58) Field of Classification Search
CPC ............. G06F 11/1469; G06F 11/1464; G06F 21/602; G06F 2201/84
See application file for complete search history.

(56) References Cited

U.S. PATENT DOCUMENTS

| | | | | |
|---|---|---|---|---|
| 8,037,319 | B1* | 10/2011 | Clifford | H04L 9/0894 |
| | | | | 713/193 |
| 10,284,367 | B1* | 5/2019 | Miller | H04L 63/061 |
| 11,032,259 | B1* | 6/2021 | Bernat | H04L 63/061 |
| 2003/0021417 | A1* | 1/2003 | Vasic | H04L 9/3263 |
| | | | | 713/155 |
| 2011/0276781 | A1* | 11/2011 | Sengupta | G06F 12/0897 |
| | | | | 711/216 |
| 2014/0025948 | A1* | 1/2014 | Bestler | H04L 9/0863 |
| | | | | 713/167 |
| 2014/0089683 | A1* | 3/2014 | Miller | H04L 9/085 |
| | | | | 713/193 |
| 2014/0250303 | A1* | 9/2014 | Miller | G06F 21/602 |
| | | | | 713/171 |
| 2016/0062918 | A1* | 3/2016 | Androulaki | H04L 9/0861 |
| | | | | 713/193 |
| 2016/0292429 | A1* | 10/2016 | Manville | G06F 3/0641 |
| 2018/0157852 | A1* | 6/2018 | Manville | G06F 16/137 |
| 2018/0357427 | A1* | 12/2018 | Lindell | G06F 21/6227 |
| 2019/0182042 | A1* | 6/2019 | Ebrahimi | H04L 9/3234 |

(Continued)

*Primary Examiner* — J. Brant Murphy
(74) *Attorney, Agent, or Firm* — Foley & Lardner LLP

(57) ABSTRACT

A method for recovering data from a database, the method performed by a device having a processor, the method including encrypting information stored in the database using an encrypting cryptographic key, sending encrypted information associated with a specific entity to a remote device associated with the specific entity, where the remote device lacks access to a decrypting cryptographic key enabled to decrypt the information associated with a specific entity, upon failure of the database, sending the encrypted information associated with the specific entity from the remote device to a recovering server, and decrypting the encrypted information by the recovering server.

17 Claims, 4 Drawing Sheets

(56) References Cited

U.S. PATENT DOCUMENTS

| | | | |
|---|---|---|---|
| 2019/0272380 A1* | 9/2019 | Manville | G06F 3/0641 |
| 2020/0082102 A1* | 3/2020 | Manville | G06F 21/602 |
| 2021/0273929 A1* | 9/2021 | Bernat | H04L 9/085 |

* cited by examiner

SYSTEM AND METHOD FOR DATABASE RECOVERY

FIELD

The invention relates generally to recovering data of a database.

BACKGROUND

Database recovery is the process of restoring the database to a correct state in the event of a failure. The failure may result from technical matters, such as loss of power, disc failure, hardware failure and the like. The failure may result from a data security attack, in which the data in the database is no longer available, for example by deleting, corrupting or changing the data in the database.

Database recovery solutions typically include manual reprocessing and automated recovery. In manual reprocessing, the database is periodically backed up in another machine, and all transactions applied since the last backup are recorded. If the database crashes, the last backed up version is restored and the transactions after the last backup are provided by other devices communicating with the database, such as users' devices. In automated recovery techniques, there is a log file in addition to the data in the database. The log file stores the changes made to the database. The changes are needed when recovering the database. The recovery may include processes such as rollback, defined as cancelling partially completed transactions, which were in progress at the time of the database crash, and rollforward, defined as re-performing transactions committed before the database crash and not yet completed.

Distributed database recovery is especially effective when the database is updated frequently while the old data become useless. One cannot use old data for recovery. For example, some information security products have the shares stored on users' machines and in the server's database. The shares are refreshed after each operation, such that the database is updated frequently. After refreshing, old shares become useless. To avoid user keys' loss, the database has to be backed up constantly. Distributed database recovery saves the need to manage an expensive centralized backup system. By storing/updating the database user record on the user's machine.

SUMMARY

In one aspect of the invention a method is provided for recovering data from a database, the method performed by a device having a processor, the method including encrypting information stored in the database using an encrypting cryptographic key, sending encrypted information associated with a specific entity to a remote device associated with the specific entity, where the remote device lacks access to a decrypting cryptographic key enabled to decrypt the information associated with a specific entity, upon failure of the database, sending the encrypted information associated with the specific entity from the remote device to a recovering server, decrypting the encrypted information by the recovering server.

In some cases, the data in the database is split into shares, one share is stored in the user's device and another share is encrypted by the recovery key. In some cases, the method further includes signing the content sent to the recovery machine. In some cases, the method further includes receiving a request to recover the information in the database. In some cases, the recovery machine is a hardware security module.

In some cases, the hardware security module includes multiple recovery keys, each key is associated with a specific database. In some cases, the method further includes sending the encrypted information from the recovering server to the database.

In some cases, the database stores encrypted information associated with multiple specific entities, where the database sends each portion of the encrypted information to a separate remote device of multiple remote devices, where each of the remote devices sends the encrypted information to the recovering server separately. In some cases, the recovering server decrypts the encrypted information from each remote device using a different recovering key.

In another aspect of the invention a computerized system is provided having a memory and a processor for executing a set of instructions stored in the memory, the instructions including encrypting information stored in the database using an encrypting cryptographic key, sending encrypted information associated with a specific entity to a remote device associated with the specific entity, where the remote device lacks access to a decrypting cryptographic key enabled to decrypt the information associated with a specific entity, upon failure of the database, sending the encrypted information associated with the specific entity from the remote device to a recovering server, decrypting the encrypted information by the recovering server.

In some cases, the data in the database is split into shares, one share is stored in the user's device and another share is encrypted by the recovery key. In some cases, the instructions further include signing the content sent to the recovery machine.

In some cases, the instructions further include receiving a request to recover the information in the database. In some cases, the recovery machine is a hardware security module.

In some cases, the hardware security module includes multiple recovery keys, each key is associated with a specific database. In some cases, the instructions further include sending the encrypted information from the recovering server to the database.

In some cases, the database stores encrypted information associated with multiple specific entities, where the database sends each portion of the encrypted information to a separate remote device of multiple remote devices, where each of the remote devices sends the encrypted information to the recovering server separately. In some cases, the recovering server decrypts the encrypted information from each remote device using a different recovering key.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The technical challenge solved by embodiments of the invention is to avoid user key lose and avoid data loss in database failure situations. The database has to be backed up constantly, and distributed database recovery saves the need to manage an expensive centralized backup system.

The technical solution provided by embodiments of the invention include a method and system for database recovery. The data in the database includes data associated with users, such as prior actions done by users, financial transactions, files, events, commands and messages exchanged between a user and the database or the organization operating the database. The organization may be a governmental organization, a bank, a business, a store, an online service, and the like.

The data in the database is backed up periodically in a user's device. The user's device may be a cellular phone, a laptop, a tablet, an account owned or operated by the user, such as an email account, an online service account, a data storage account such as Dropbox or Google cloud and the like. In some cases, only data in the database which is associated with a specific user is backed up at a user's device of a specific user. In some other cases, a specific user's device may store backed up data of multiple users.

The data at the user's device is encrypted by a key not accessible to the user, or to applications operating at the user's device. For example, the backed up data is encrypted at the database, or sent from the database to an encrypting machine where the data is encrypted and then sent to the user's device.

In case of a database failure, or any other request to provide the backed up data stored at the user's device, the backed up data may be sent from the user's device to a recovery machine, where the backed up data is decrypted, becoming accessible to the database. The recovery machine stores recovery keys used to decrypt the backed up data. Another option is that the backed-up data is encrypted by a key which is encrypted and can be opened only within the backup machine (e.g., HSM). Meaning that only the Data encryption key is sent to the HSM.

Figure 1:
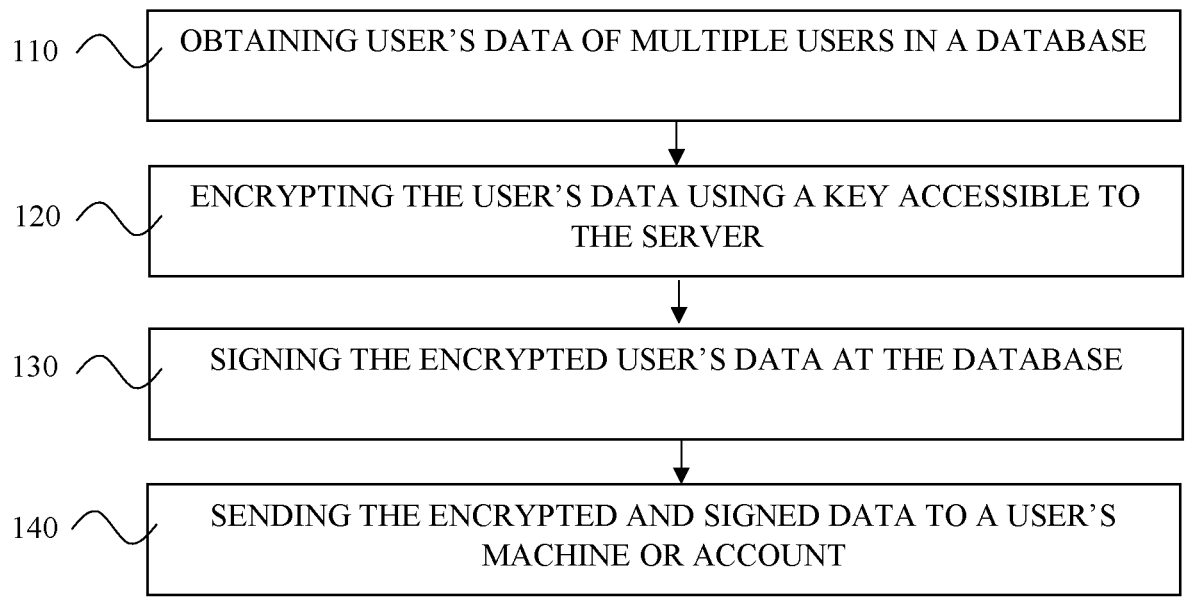
FIG. 1 shows a method for preparing data to a database failure event, according to an exemplary embodiment of the invention.

FIG. 1 shows a method for preparing data to a database failure event, according to an exemplary embodiment of the invention.

Step 110 discloses Obtaining user's data of multiple users in a database. The user's data may include personal information, such as name, address, age and the like. The user's data may include prior commands inputted into a system operating the database, for example by the user or by a third party, such as a bank, an e-commerce website, a payment platform such as PayPal and the like. The user's data may be formatted as specific data fields, or as free text.

Step 120 discloses encrypting the user's data using a cryptographic key accessible to the database. The cryptographic key may be in the form of a string used by a cryptographic algorithm to encrypt the user's data. The cryptographic key used to encrypt the user's data is a private key and is not accessible to the user's device.

The encryption process may be performed periodically, for example once an hour or once a day, or in response to an event, such as update of the user's data in the database. The encryption process may be performed by a machine that stores the database, such as a server.

Step 130 discloses signing the encrypted user's data at the database. Signing is defined as digital signature, in which additional data is added to the encrypted user's data, the additional data enables the recipient of the encrypted user's data, i.e., the user's device, to verify that the encrypted user's data was indeed sent from the database and not altered by an attacker.

Step 140 discloses sending the encrypted and signed data to a user's machine or account. Sending the encrypted and signed data may be performed over a communication network, such as the internet, intranet, a local access network, a wide access network, and the like. Sending may be performed as a single file, or as packets. Sending may be done by inputting the encrypted and signed data into a web-based portal, or a mobile application operating in the user's device, the portal or application enabling machines to input data therein.

Figure 2:
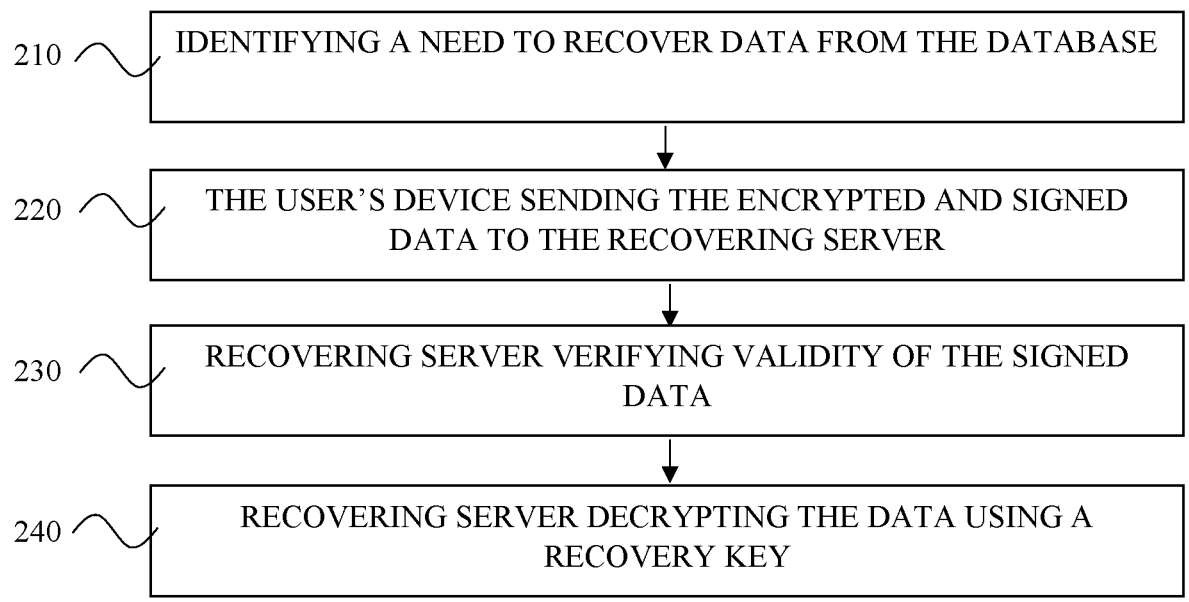
FIG. 2 shows a method for recovering data upon a database failure event, according to an exemplary embodiment of the invention.

FIG. 2 shows a method for recovering data upon a database failure event, according to an exemplary embodiment of the invention.

Step 210 discloses identifying a need to recover data from the database. The need may be initiated when a user wishes to access data in the database or database operator tries to access the user's data. The request may be sent as a message, such as an email message, SMS, a notification to a mobile application operating on the user's device, changing a value in a memory address accessible to the user's device, and the like. The request may include a notification concerning the database failure, such as database identifier, database URL, date of database failure and the like. The request may include information enabling the user's device to verify the authenticity of the message, such as unique identifier which is sent to the user's device only in case of a database failure. The request may include an address of a recovering server selected by the database to perform a data recovery process. In some cases, the database is connected to multiple recovering servers, and selects a single recovering server to prevent attackers from attacking the machine in which the data is decrypted.

Step 220 discloses the user's device sending the encrypted and signed data to the recovering server. The address may be a memory address accessible to the recovering server. The address may be a URL address of the recovering server. Sending the encrypted and signed data may be performed over a communication network, such as the internet, intranet, a local access network, a wide access network, and the like. Sending may be performed as a single file, or as packets. Sending may be done by inputting the encrypted and signed data into a web-based portal, or a mobile application operating in the user's device, the portal or application enabling machines to input data therein.

The user's device may send a bundle of information to the recovering server. The bundle may include the encrypted user's data, identifiers of the user's device, a public key unique to the user's device and the like. In some cases, the recovering server can decrypt the encrypted user's data only using a combination of a cryptographic key sent by the user's device and a recovering key stored in the recovering server.

Step 230 discloses the recovering server verifying validity of the signed data. Verifying may be performed by checking the signature of the encrypted data as provided from the user's device to the recovering server. Checking the signature may be performed by The server Holds a trusted certificate with public key corresponding the Signing private Key. The trusted Certificate is an input to the Signature verification procedure.

Step 240 discloses the recovering server decrypting the data using a recovery key. In some cases, each time the recovering server decrypts information associated with a single user. This is enabled because the recovering machine receives encrypted data from a specific user's device that holds data associated with a specific user or a specific organization, not all the data stored in the database.

In order to recover all the data in the database, the process is performed multiple times, each time with a single user's device that stores encrypted information from the database. For example, the data in the database may be stored in more than 1,000 different devices, more than 10,000 different devices, more than 100,000 different devices and the like. A single database may cooperate with multiple recovering servers when recovering the data, for example to prevent an attacker from attacking all the information in the database. In some cases, a single recovering server decrypts the encrypted information provided from a single user's device in a given time frame. That is, the recovering server stores multiple recovering keys, each recovering key of the multiple recovering keys may be associated with a specific single user's device, enabling to decrypt information provided from a single user's device.

Figure 3:
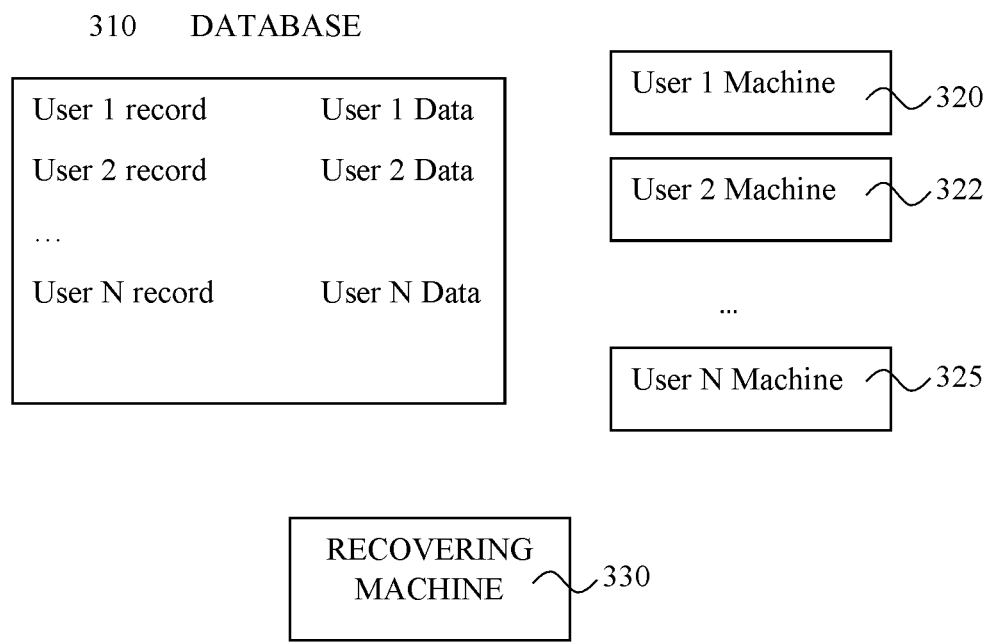
FIG. 3 shows a system configured to recover data upon a database failure event, according to an exemplary embodiment of the invention.

FIG. 3 shows a system configured to recover data upon a database failure event, according to an exemplary embodiment of the invention, in which a computerized agent operates in the user's devices 320, 322, 325 and in the recovering server 330, not in the database 310. The database 310 is configured to store and protect information associated with users, or with an organization. In case the data in the database is not associated with persons, but with organizations, the user's devices 320, 322, 325 may be used by machines or persons handling the data on behalf of the organization, such as a governmental entity, a school, a business entity and the like.

The database 310 encrypts information associated with a specific user or organization and sends the encrypted data to a user's device such as devices 320, 322, 325. The devices 320, 322, 325 lack access to the cryptographic keys used to encrypt the data by the database 310. The devices 320, 322, 325 may be virtual machines for example operating by a server, or physical devices such as cellular phones, laptops, personal computers, physical servers and the like.

The system also includes a recovering server 330 used to recover the data in case of failure of the database 310. In some cases, the recovery machine is a hardware security module (HSM). The HSM may be based on hardware or software.

The recovering server 330 stores one or more recovering keys used to decrypt the information encrypted by the database 310. In some cases, the database 310 uses different cryptographic keys when encrypting the data of different users or different organizations. For example, the database 310 encrypts data of organization #1 using cryptographic key #1, sending the encrypted data of organization #1 to device #1, the database 310 encrypts data of organization #2 using cryptographic key #2, sending the encrypted data of organization #2 to device #2 and so on. This way, the recovering server 330 stores multiple cryptographic keys, each of which is used to encrypt data provided from a different device, such as devices 320, 322, 325.

Figure 4:
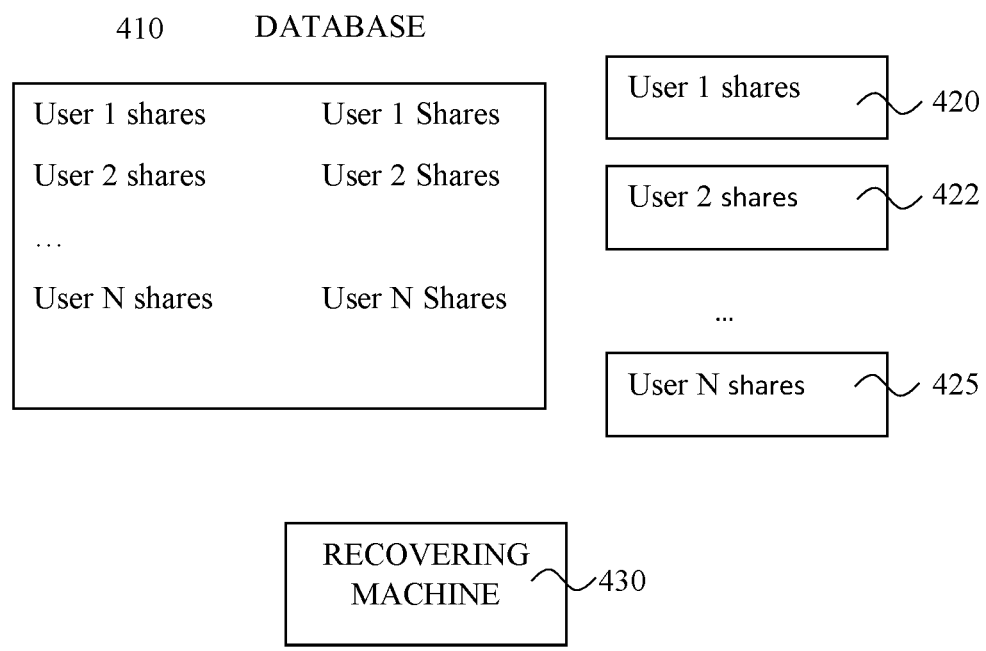
FIG. 4 shows a system configured to recover data upon a database failure event when the data is divided to shares in the database and the user's device, according to an exemplary embodiment of the invention.

FIG. 4 shows a system configured to recover data upon a database failure event when the data is divided to shares in the database and the user's device, according to an exemplary embodiment of the invention.

The system includes a database 410 that stores shares of information. In the data fields stored in the database 410, the shares are useless and meaning less without a matching share stored in the user's devices 420, 422, 425. For example, information of user #1 is stored partly in the database 410 and partly in user's device 420, but the information of user #1 cannot be used unless a multi-party computation (MPC) process takes place between the database 410 and the user's device 420 in order to produce information which can be used by a third party, for example the user's name, passwords, prior transactions and the like.

When recovering the database 410 that stores shares of the user's data, only the shares are encrypted and stored in the user's device in an encrypted manner that cannot be decrypted by the user's device. The shares can only be decrypted by the recovering server 430. This way, even after decrypting the shares, the data fields are not store in their entirety in a single entity, device or machine.

The system includes a memory for storing information. The memory may store a set of instructions for performing the methods disclosed herein. The system may also include a communication unit for exchanging information with other systems/devices. The system includes a processor for executing the instructions stored in the memory. The processor may be a general purpose processor, a microprocessor, or any other processor desired by a person skilled in the art.

While the invention has been described with reference to an exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiments disclosed herein.

What is claimed is:

1. A method for recovering data from a database, the method comprising:
   performing, via one or more processors, operations comprising:
      encrypting information stored in the database using an encrypting cryptographic key to generate encrypted information associated with a specific entity, wherein the database stores second encrypted information associated with a second specific entity different from the specific entity;
      sending the encrypted information associated with the specific entity to a remote device associated with the specific entity, wherein the remote device lacks access to a decrypting cryptographic key enabled to decrypt the encrypted information associated with the specific entity;
      sending the second encrypted information associated with the second specific entity to a second remote device different from the remote device associated with the specific entity;
      determining a failure of the database;
      upon the failure of the database, sending the encrypted information associated with the specific entity from the remote device to a recovering server, and sending the second encrypted information from the second remote device to the recovering server; and decrypting the encrypted information by the recovering server.

2. The method of claim 1, wherein user-specific data in the database is split into shares comprising a first share stored on the remote device associated with the specific entity and a second share that is at least part of the encrypted information, and wherein decrypting the encrypted information by the recovering server comprises obtaining the second share by the recovering server using a recovery key that is not stored on the remote device.

3. The method of claim 1, the operations further comprising signing the encrypted information sent to the recovering server.

4. The method of claim 1, wherein the recovering server comprises a hardware security module configured to decrypt the encrypted information.

5. The method of claim 4, wherein the hardware security module comprises multiple recovery keys comprising a first recovery key associated with the database and a second recovery key associated with a second database different from the database.

6. The method of claim 1, wherein the recovering server decrypts the encrypted information using a first recovery key and decrypts the second encrypted information using a second recovery key different from the first recovery key.

7. A computerized system comprising:
one or more processors and memory storing instructions that, when executed by the one or more processors, cause operations comprising:
encrypting information stored in a database using an encrypting cryptographic key to generate encrypted information associated with a first entity;
sending the encrypted information associated with the first entity to a remote device associated with the first entity, wherein the remote device lacks access to a decrypting cryptographic key enabled to decrypt the encrypted information associated with the first entity;
upon failure of the database, sending the encrypted information associated with the first entity from the remote device to a recovering server, wherein the recovering server comprises a hardware security module configured to decrypt the encrypted information; and
decrypting the encrypted information by the recovering server.

8. The system of claim 7, wherein data associated with the first entity is split into shares comprising a first share stored on the remote device associated with the first entity and a second share that is at least part of the encrypted information, and wherein decrypting the encrypted information by the recovering server comprises obtaining the second share by the recovering server using a recovery key that is not stored on the remote device.

9. The system of claim 7, the operations further comprising signing the encrypted information sent to the recovering server.

10. The system of claim 7, wherein the hardware security module comprises multiple recovery keys comprising a first recovery key associated with the database and a second recovery key associated with a second database different from the database.

11. The system of claim 7, wherein the database stores second encrypted information associated with a second entity different from the first entity, the operations further comprising:
sending the second encrypted information associated with the second entity to a second remote device different from the remote device associated with the first entity, wherein the second encrypted information is sent from the second remote device to the recovering server upon the failure of the database.

12. The system of claim 11, wherein the recovering server decrypts the encrypted information using a first recovery key and decrypts the second encrypted information using a second recovery key different from the first recovery key.

13. A method comprising:
performing, via one or more processors, operations comprising:
encrypting information stored in a database using an encrypting cryptographic key to generate encrypted information associated with a first user;
sending the encrypted information associated with the first user to a user device associated with the first user, wherein the user device lacks access to a decrypting cryptographic key enabled to decrypt the encrypted information associated with the first user;
determining occurrence of a failure event of the database; and
in response to the occurrence of the failure event, causing the user device to send the encrypted information associated with the first user from the user device to a recovery system that decrypts the encrypted information, wherein data associated with the first user is split into shares comprising a first share and a second share, and wherein the recovery system obtains the second share by decrypting the encrypted information using a cryptographic key that is not stored on the user device.

14. The method of claim 13, wherein the recovery system comprises a hardware security module configured to decrypt the encrypted information.

15. The method of claim 14, wherein the hardware security module comprises multiple recovery keys comprising a first recovery key associated with the database and a second recovery key associated with a second database different from the database.

16. The method of claim 13, wherein the database stores second encrypted information associated with a second user different from the first user, the operations further comprising:
sending the second encrypted information associated with the second user to a second user device different from the user device associated with the first user, wherein the second encrypted information is sent from the second user device to the recovery system in response to the occurrence of the failure event.

17. The method of claim 16, wherein the recovery system decrypts the encrypted information using a first recovery key and decrypts the second encrypted information using a second recovery key different from the first recovery key.

* * * * *